United States Patent
Bangel et al.

(10) Patent No.: US 6,915,311 B2
(45) Date of Patent: Jul. 5, 2005

(54) DATABASE SYSTEM FOR SELECTIVE CLEARING OF STORED CONFLICTING REPLICATED DOCUMENTS BY PERIODIC APPLICATION OF A PRIORITIZED SEQUENCE OF ATTRIBUTES WITH VALUES TO DISTINGUISH BETWEEN REPLICATED DOCUMENTS

(75) Inventors: Matthew Jay Bangel, Owego, NY (US); Victoria A. Hanrahan, Beacon, NY (US); James A. Martin, Jr., Endicott, NY (US); Doug G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 10/005,141

(22) Filed: Dec. 5, 2001

(65) Prior Publication Data

US 2003/0105779 A1 Jun. 5, 2003

(51) Int. Cl.$^7$ .............................................. G06F 17/30
(52) U.S. Cl. .............................. 707/200; 707/8; 707/10; 707/100
(58) Field of Search .............................. 707/8, 10, 100, 707/104.1, 200, 201, 1, 2, 202, 203; 705/7; 709/201, 204, 205, 207, 217, 220, 223, 224, 225, 230

(56) References Cited

U.S. PATENT DOCUMENTS

| | | | |
|---|---|---|---|
| 5,737,601 A | 4/1998 | Jain et al. | 395/617 |
| 5,745,753 A | 4/1998 | Mosher, Jr. | 395/618 |
| 5,806,075 A | 9/1998 | Jain et al. | 707/201 |
| 5,864,654 A | 1/1999 | Marchant | 395/182.01 |
| 5,878,434 A | 3/1999 | Draper et al. | 707/202 |
| 6,081,832 A | 6/2000 | Gilchrist et al. | 709/206 |
| 6,202,085 B1 | 3/2001 | Benson et al. | 709/205 |
| 6,240,414 B1 * | 5/2001 | Beizer et al. | 707/8 |
| 6,636,873 B1 * | 10/2003 | Carini et al. | 707/201 |

* cited by examiner

Primary Examiner—Shahid Alam
Assistant Examiner—Fred I. Ehichioya
(74) Attorney, Agent, or Firm—J. B. Kraft; David A. Mims, Jr.

(57) ABSTRACT

Periodically clearing databases of stored conflicting replicated documents in a regular automatic way which comprises a combination of defining a prioritized sequence of predetermined attribute values to be applied to distinguish between the stored documents in each of said replication conflicts and periodically applying said sequence of predetermined attribute values to said plurality of replication conflicts to resolve each conflict by eliminating all but one of the documents in said conflict for insufficient value of a predetermined attribute. This prioritized sequence of attribute values may be applied at regular periodic intervals.

12 Claims, 5 Drawing Sheets

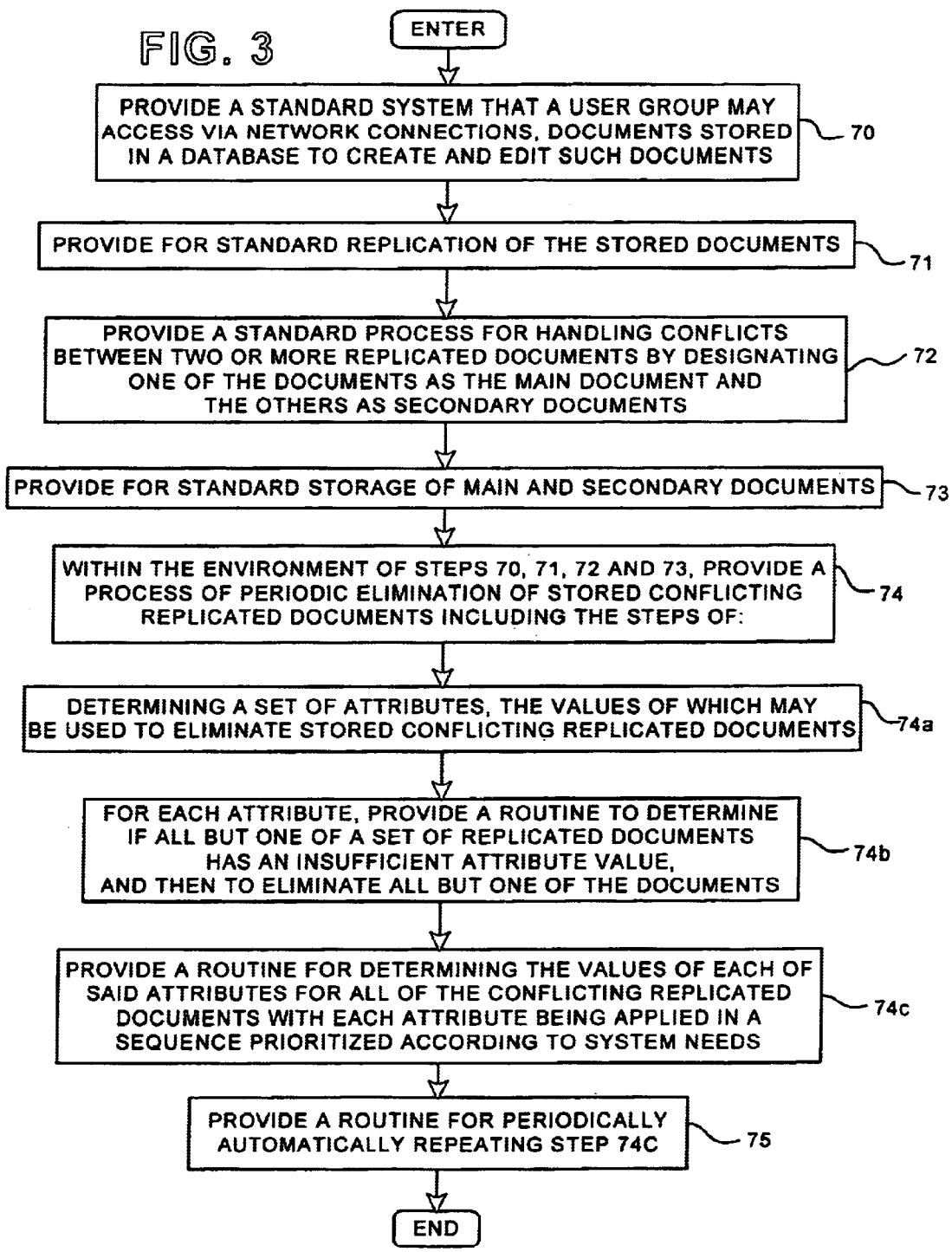

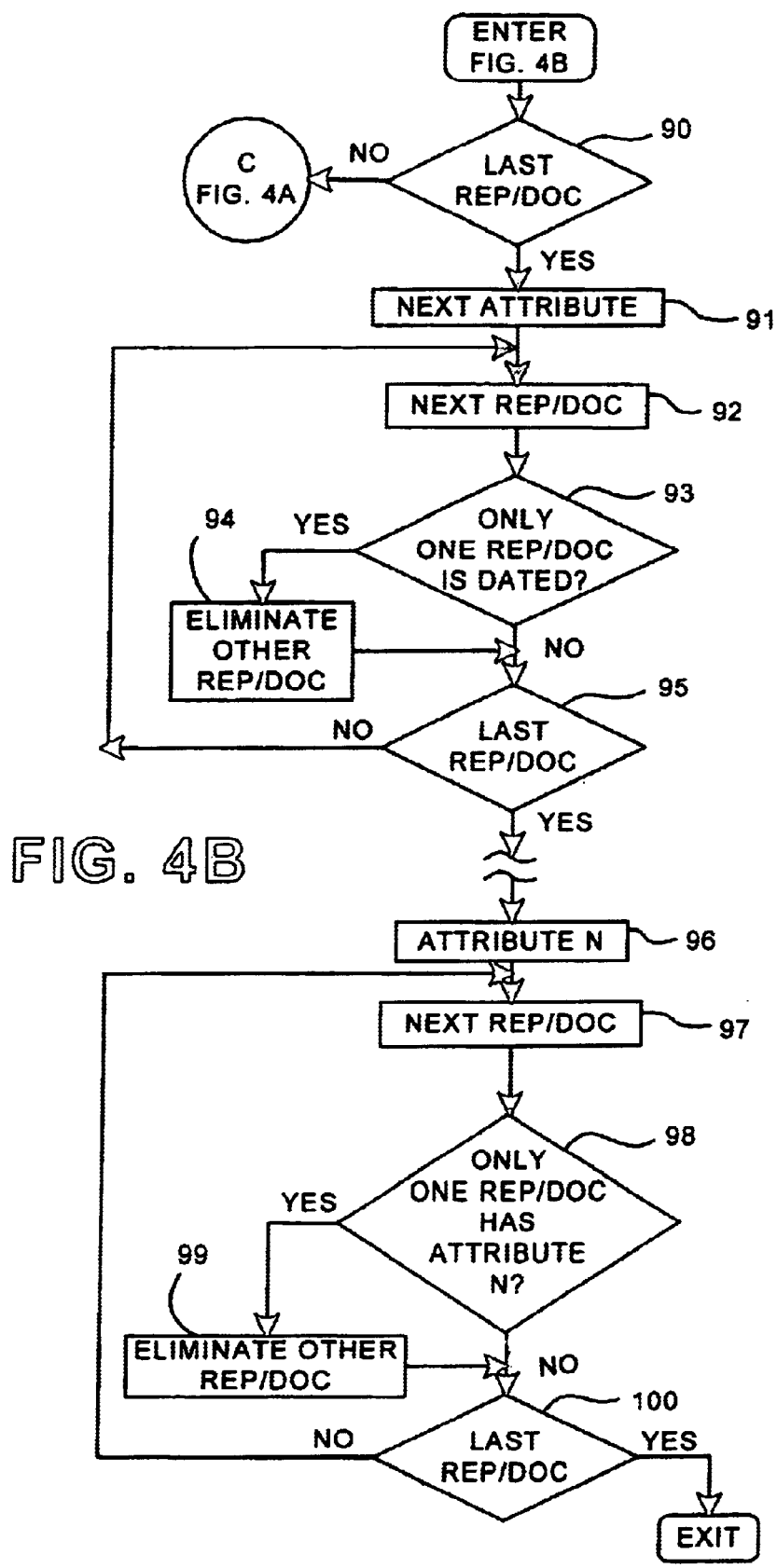

DATABASE SYSTEM FOR SELECTIVE CLEARING OF STORED CONFLICTING REPLICATED DOCUMENTS BY PERIODIC APPLICATION OF A PRIORITIZED SEQUENCE OF ATTRIBUTES WITH VALUES TO DISTINGUISH BETWEEN REPLICATED DOCUMENTS

TECHNICAL FIELD

The present invention relates to storage systems for work group created and edited documents, and particularly to the handling of conflicts between such work group documents that are replicated.

BACKGROUND OF RELATED ART

The past decade has been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents, media and programs. With this expansion, businesses and consumers have direct access to all matter of documents, media and computer programs through networked communications.

With the rise of the Internet and related private and public networks, communication channels have increased so that world wide inexpensive electronic mail is readily available. This has led to the rapid development of work group software or groupware systems to be available to groups of computer users varying in size from a few people to a world wide business organization. Such groupware systems provide access to groups of related users to mutually create and edit documents. IBM™ Lotus™ Notes 4.5™ is a typical groupware system. Another function that has been greatly facilitated by electronic mail is the ability to replicate databases, as well as documents stored in such databases, i.e. documents may readily be replicated and stored at locations for the convenience of individual users or groups of users. Groupware replication is discussed in greater detail in the text, *The ABCs of Lotus Notes 4.5, Rupert Clayton,* 1997, Sybex Inc., Alameda, Calif., particularly in Chapter 13, pp. 262–276.

One significant problem that systems providing for group editing of replicated documents must contend with are replication conflicts. These occur when two or more users edit the same document in different replicas, i.e. in different replicated documents. Groupware systems have processes for handling replication conflicts. For example in Lotus Notes (Notes), conflicting edits by different users are merged into a single document whenever possible, e.g. if two users edit different fields in the same replicated document, Notes saves both edits in the replicated document. However, when more than one user edits the same fields, then Notes provides for some rules for determining which is the main document of the conflicting replicated pair or larger group of documents. In such a case, the other documents of the pair or group are still saved with some indication that is displayed to indicate the other documents as secondary documents.

Thus, in groupware, of which Lotus Notes is an example, it is recognized that even when one of the conflicting replicated documents is selected as the main replicated document, the other replicated documents should still be stored as secondary documents. In the case of groupware, the interests of the participating users may be so diverse that there may still be some user interest in the secondary conflicting replicated documents. However, in order to avoid overloading the storage in the groupware database, it is necessary for the database administrator to periodically go into the database and look through the replication conflicts document by document in order to determine which document in each conflict should remain and which document should be eliminated from storage in the database. This may be a lengthy process dependent upon the number and frequency of replication conflicts.

SUMMARY OF THE PRESENT INVENTION

The present invention offers a solution to the problem of lengthy replicated document elimination by providing a system, method and program for periodically clearing databases of stored conflicting replicated documents in a regular automatic way which comprises a combination of means for defining a prioritized sequence of predetermined attribute values to be applied to distinguish between the stored documents in each of said replication conflicts with means for periodically applying said sequence of predetermined attribute values to said plurality of replication conflicts to resolve each conflict by eliminating all but one of the documents in said conflict for insufficient value of a predetermined attribute. This prioritized sequence of attribute values may be applied at regular periodic intervals. Replication conflicts usually involve only two replicated documents. However, more than two replicated documents may be involved in each of such conflicts.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 1 is a block diagram of a data processing system including a central processing unit and network connections via a communications adapter which is capable of functioning both as a display computer for I/O by respective groupware users for editing and creating documents; and as the server used to access databases of stored replicated documents to perform the method of the present invention to periodically eliminate extra conflicting replicated documents;

FIG. 3 is an illustrative flowchart describing the setting up of the elements of a program according to the present invention for applying a sequence of prioritized attributes to sets of stored conflicting replicated documents to eliminate some documents of insufficient attribute value; and FIGS. 4A and 4B are a flowchart of an illustrative run of the program set up in FIG. 3.

DETAILED DESCRIPTION OF THE PREFERRED EMBODIMENT

Figure 2:
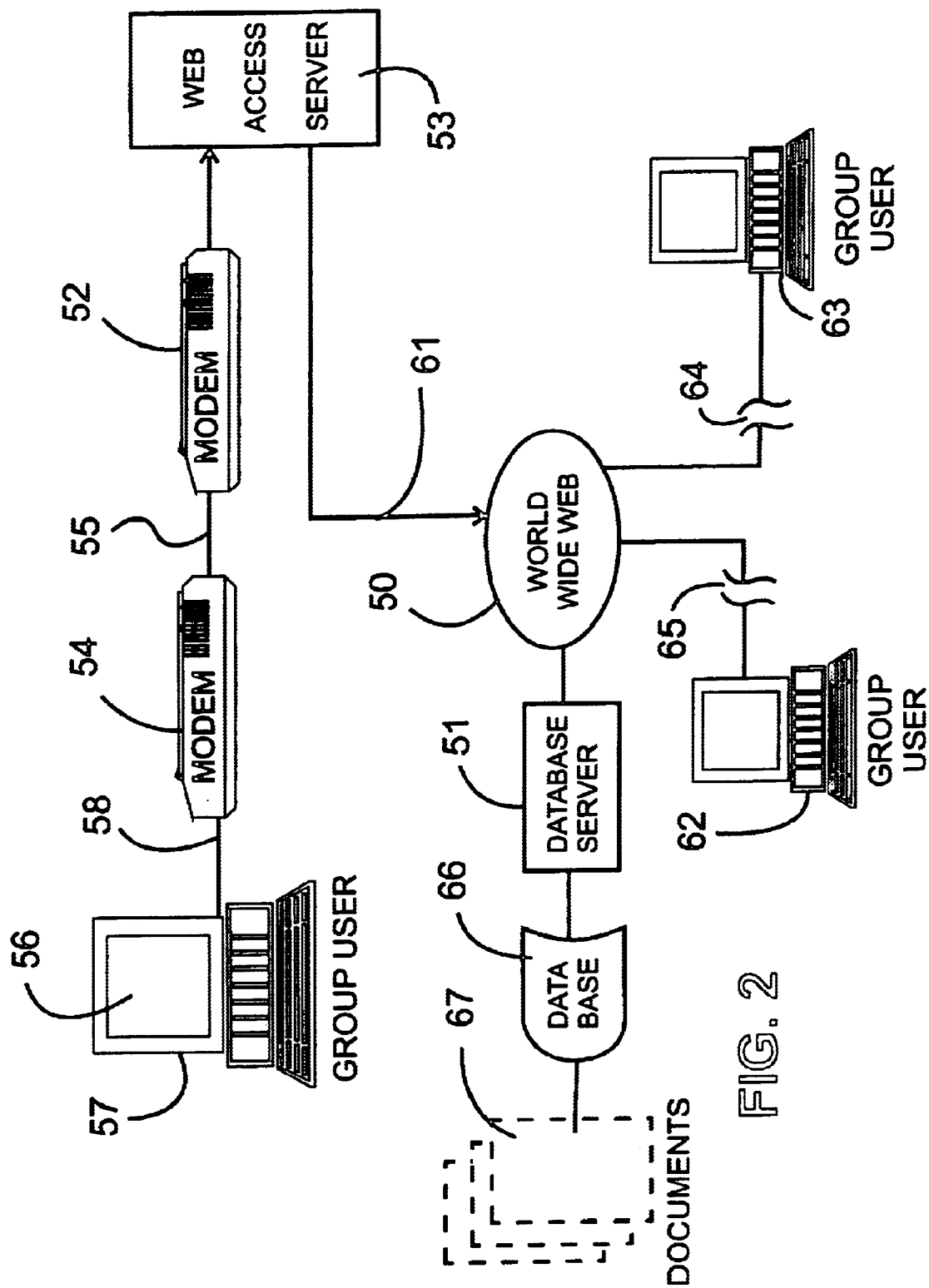
FIG. 2 is a generalized diagrammatic view of a portion of a group user network, such as the Web, to showing a plurality of user I/O terminals and an administered database where the conflicting replicated documents may be stored.

The present invention is applicable to any groupware networked system wherein a group of identifiable users share access to documents in a shared database that may be distributed so that the users may access documents which may be replicated throughout the database. These users may create and/or edit such documents or replicated documents. FIG. 2 is a generalized illustration of such a database 66 of documents 67 that is accessed by a group of users at network computer terminals or stations 57, 62 and 63 which have displays 56. For the purpose of the present illustration, the connecting network is the World Wide Web (Web) or Internet 50 (the terms are used interchangeably herein). For various business transactions involving groupware documents, the network may be private for confidentially purposes. However, even with confidential concerns, businesses will use the Internet with appropriate firewalls. In our illustration we will use the Internet for our editable documents being in the form of E-mail.

The Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. In this connection, the term "documents" is used to describe data transmitted over the Web or other networks and is intended to include Web pages and E-mail documents with displayable text, graphics and other images.

Web documents are conventionally implemented in HTML language, which is described in detail in the text entitled *Just Java*, van der Linden, 1997, SunSoft Press, particularly at Chapter 7, pp. 249–268, dealing with the handling of Web pages; and also in *Mastering the Internet*, G. H. Cady et al., published by Sybex Inc., Alameda, Calif., 1996 particularly at pp. 637–642, on HTML in the formation of Web pages.

Figure 1:
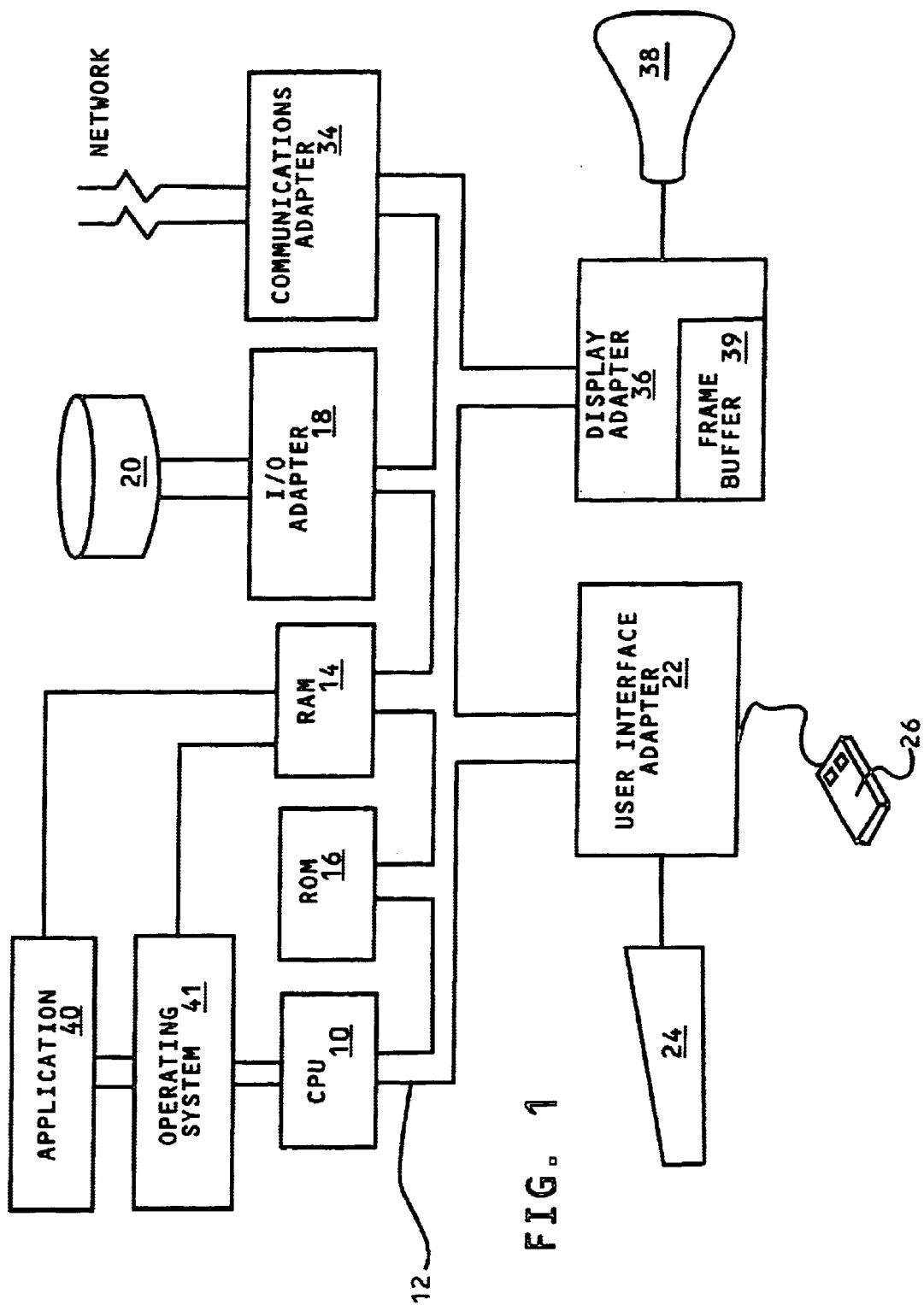
FIG. 1 is a generalized diagrammatic view of a Web portion showing how an open Web site may be accessed by and protected from malicious requesting users.

A groupware user computer display terminal, or station 57, may be implemented by the computer system set up in FIG. 1, which will hereinafter be described in greater detail.

Reference may be made to the above-mentioned *Mastering the Internet*, pp. 136–147, for typical connections between local display stations to the Web via network servers, any of which may be used to implement the system on which this invention is used. The system embodiment of FIG. 2 has a host-dial connection. Such host-dial connections have been in use for over 30 years through network access servers 53 that are linked 61 to the Web 50. The Web servers 53, which also may have the computer structure hereinafter described with respect to FIG. 1, may be maintained by an Internet Service Provider (ISP) to the client's display terminal 57. The Web server 53 is accessed by the client terminal 57 through a normal dial-up telephone linkage 58 via modem 54, telephone line 55 and modem 52. The file representative of the E-mail documents 67 are transmitted to and from display terminal 57 through Web access server 53 via the telephone line linkages from server 53, which may have accessed them from the Web 50 via linkage 61. Groupware user terminals 62 and 63 have similar Web connections 65 and 64, which are not shown. Database 66 is shown as storing illustrative documents 67 which include groups of replicated documents that are to be eliminated from storage in accordance with the present invention. The database may be conveniently controlled by a database administrator through database server 67. This arrangement has been simplified to illustrate the present invention. In actuality, the database of stored replicated documents may be distributed throughout the network, and the program of the present invention to eliminate stored replicated documents may be run by the system administrator through database server 51 or by authorized groupware users on any of the terminals 57, 62 or 63.

Now, with respect to FIG. 1, there will be described a typical data processing terminal is shown which may function as the computer controlled network terminals 57, 62 and 63 or the database server 51. A central processing unit (CPU) 10, such as one of the PC microprocessors or workstations, e.g. eServer pSeries available from International Business Machines Corporation (IBM), or Dell PC microprocessors, is provided and interconnected to various other components by system bus 12. An operating system 41 runs on CPU 10, provides control and is used to coordinate the function of the various components of FIG. 1. Operating system 41 may be one of the commercially available operating systems such as IBM's AIX 6000™ operating system or Microsoft's WindowsMe™ or Windows 2000™, as well as UNIX and other IBM AIX operating systems. Application programs 40, controlled by the system, are moved into and out of the main memory Random Access Memory (RAM) 14. These programs include the program of the present invention for eliminating stored replicated documents. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with the outside network to interconnect and distribute the groupware editing functions. I/O devices are also connected to system bus 12 via user interface adapter 22 and display adapter 36. Keyboard 24 and mouse 26 are all interconnected to bus 12 through user interface adapter 22. It is through such input devices that the user may interactively create, edit and replicate documents.

Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38. Through a similar display terminal, functioning as a server 51, the database administrator may access the database to carry out the present invention.

Figure 4A:
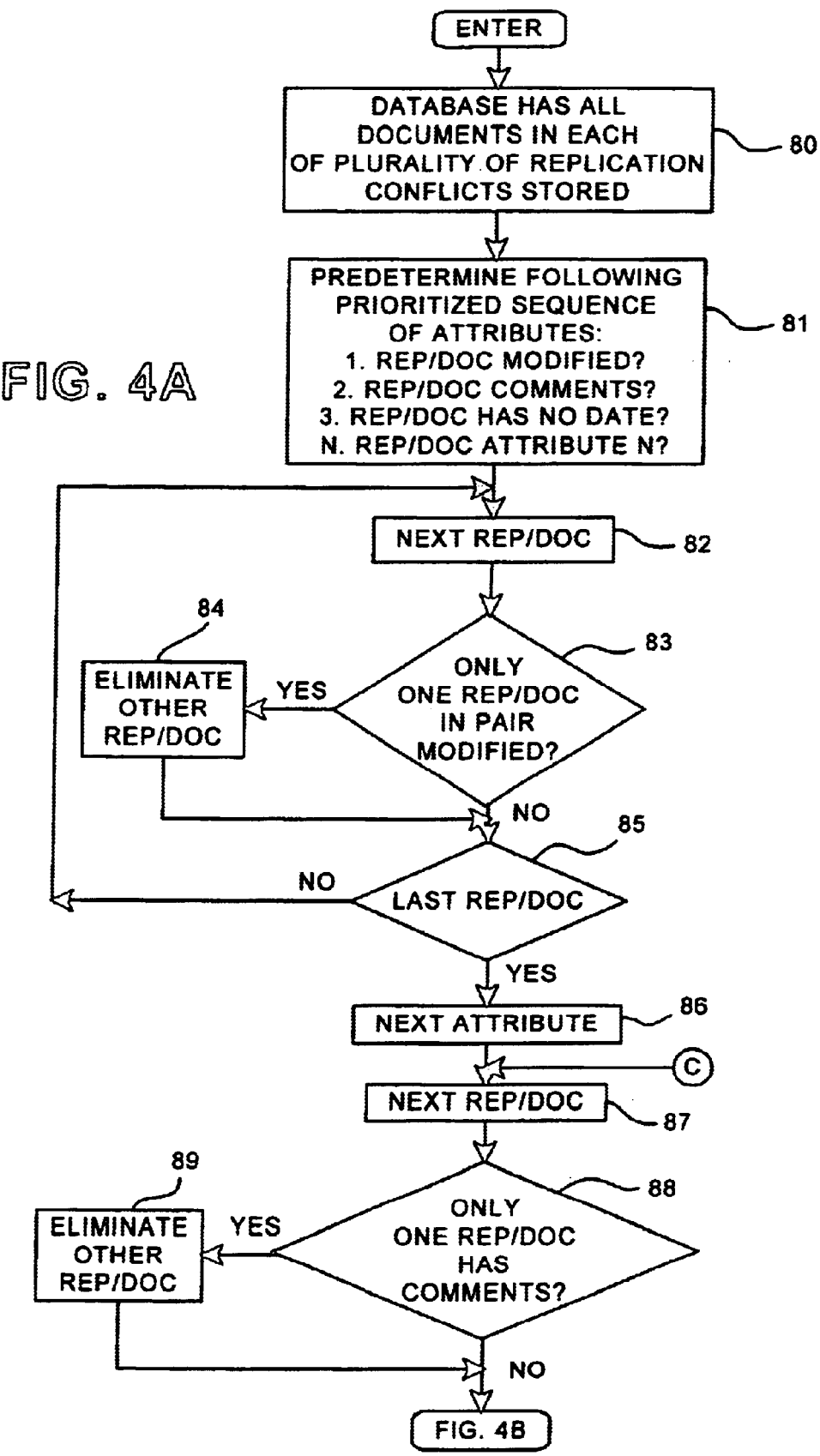

Now, with respect to FIGS. 3, 4A and 4B, we will provide an illustrative example of how the present invention may be used to eliminate stored documents that have already determined replication conflicts. The invention is applied in a standard system which enables a user group to access through an appropriate network, documents stored in a database that may be distributed throughout the network so that such users may create and edit documents, step 70. Conventional replication of the documents is provided for the convenience of the user group, step 71. The groupware system provides a standard process for handling conflicts between two or more replicated documents, usually by designating one of the documents in the conflict as the main document and the others as secondary documents, step 72. Storage for the main and secondary conflicting documents is provided, step 73. Now, within the system environment set up in steps 70 through 73, there is provided, step 74, a process for the periodic elimination of stored conflicting replicated documents, according to the present invention, which includes the following steps:

There is initially determined, e.g. by the system designer or the administrator of the database in which the replicated documents are stored, a set of attributes, the values of which may be used to distinguish one of each set of conflicting documents, and consequently to eliminate the other stored conflicting documents in the set, step 74a.

Accordingly, for each attribute, there is provided a routine to determine if all but one of each set of conflicting documents has an insufficient value, and, thus, eliminate all but the document that does have the sufficient value, step 74b.

There must also be provided a process whereby the system designer or database administrator may designate values for each of the attributes for each set of conflicting documents that will distinguish such documents based upon the system needs and will also permit the application of the attributes in a sequence prioritized based upon such system needs, step 74c.

There is also provided a routine for automatically periodically repeating step 74c to periodically eliminate conflicting documents stored in the database, step 75.

The running of the process set up in FIG. 3 will now be described with respect to the flowchart of FIGS. 4A and 4B. The initial database, step 80, has many sets of stored conflicting replicated documents, the conflicts in which have already been determined, and the groupware system has already determined according to its protocols which document in the set is the main document and which are the secondary documents. It should be remembered that the groupware system will only designate one of the conflicting documents as the main document for handling or administrative purposes; it does not eliminate the secondary documents. These secondary documents are still stored with some indicator that it is secondary, e.g. in Notes, the indicator is a black diamond. The secondary documents in replication conflicts are conventionally still saved in data storage in recognition that there are often many and diverse users in a groupware system who may still have a greater interest in the secondary documents. However, the stored conflicting replicated documents have to eventually be weeded out of storage in the database. Conventionally, this requires that someone, such as the database administrator, do this by viewing and deciding on the documents, set by set of conflicting documents. The present invention avoids such a tedious process.

In the illustrative process of FIG. 4A, for convenience in description we will assume that each set of replication conflict documents will only have a pair of documents, the main document and the secondary document. In applying the attribute value system, it does not matter which document has been designated as the main or secondary document. Thus, step 81, the following prioritized sequence of attribute values is initially determined:
1. Has the replicated document (rep/doc) been modified?
2. Does the rep/doc have an entry in its comments field?
3. Does the rep/doc have a date entry?
N. Does the rep/doc have attribute N?

The first or next pair of conflicting stored rep/docs is called, step 82. A determination is made as to whether only one of the pair has the attribute value of having been modified, step 83. If Yes, the other rep/doc that has the insufficient value of having not been modified is eliminated, step 84. Then, or if step 83 determination is No, a determination is made, step 85, as to whether this is the last pair of stored conflicting rep/docs. If No, the process returns to step 82 where the next rep/doc is called. If the determination in step 85 is Yes, then the next attribute is retrieved, step 86. Thus, the first or next pair of conflicting stored rep/docs is called, step 87. A determination is made as to whether only one of the pair has the attribute value of having comments entered, step 88. If Yes, the other rep/doc that has the insufficient value of having no comments is eliminated, step 89. Then, or if step 88 determination is No, the process proceeds to FIG. 4B where a determination is made, step 90, as to whether this is the last pair of stored conflicting rep/docs. If No, the process returns via branch "C" to step 87, FIG. 4A, where the next rep/doc is called. If the determination in step 90 is Yes, then the next attribute is retrieved, step 91. The first or next pair of conflicting stored rep/docs is called, step 92. A determination is made as to whether only one of the pair has the attribute value of being dated, step 93. If Yes, the other rep/doc that has the insufficient value of not being dated is eliminated, step 94. Then, or if step 93 determination is No, the process proceeds to step 95 where a determination is made as to whether this is the last pair of stored conflicting rep/docs. If No, the process returns to step 92 where the next rep/doc is called. If the determination in step 95 is Yes, then the process proceeds as described above testing each pair of stored replication conflict documents through each attribute until step 96, where attribute N, the last attribute in the sequence, is retrieved. The first or next pair of conflicting stored rep/docs is called, step 97. A determination is made as to whether only one of the pair has attribute value attribute N, step 98. If Yes, the other rep/doc that has the insufficient value of attribute N is eliminated, step 99. Then, or if step 98 determination is No, the process proceeds to step 100 where a determination is made as to whether this is the last pair of stored conflicting rep/docs. If No, the process returns to step 97 where the next rep/doc is called. If the determination in step 100 is Yes, the application of the last attribute has been completed, and the process is exited.

One of the preferred implementations of the present invention is in application program 40. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a database system wherein a group of users have access to create and edit a plurality of documents stared in the database, a system for periodically clearing the database of stored document replication conflicts comprising:

means for designating one document in each pair of a plurality of stored pairs of replication conflicting documents as the main document and the other of said pair as the secondary document;

means for storing all documents involved in each of said plurality of pairs of replication conflicting documents;

means for defining a prioritized sequence of predetermined attribute values to be applied to distinguish between the stored documents in each of said pairs of replication conflicting documents; and means for automatically periodically applying at predetermined time intervals said sequence of predetermined attribute values to each of said pairs of said plurality of replication conflicting documents to resolve each conflict by eliminating one of the documents in a pair of conflicting documents for insufficient value of a predetermined attribute in said applied sequence of attributes.

2. The database system of claim 1 wherein one of said sequence of attribute values to be applied is that only one of said pair of said pair of conflicting documents has been modified after one of said pair has been designated as the main document to thereby eliminate said unmodified document of said pair.

3. The database system of claim 1 wherein one of said sequence of attribute values to be applied is that only one of said pair of conflicting documents has associated entered comments to thereby eliminate the document of said pair without associated comments.

4. The database system of claim 1 wherein one of said sequence of attribute values to be applied is that only one of said pair of conflicting documents has an associated date to thereby eliminate the document of said pair without an associated date.

5. In a method of creating and editing a plurality of documents by a group of users having access to said documents stored in a database, a method for periodically clearing the database of stored document replication conflicts comprising:

designating one document in each of a plurality of said stored pairs of replication conflicting documents as the main document and the other of said pair as the secondary document;

storing all documents involved in each of said plurality of pairs of replication conflicting documents;

defining a prioritized sequence of predetermined attribute values to be applied to distinguish between the stored documents in each of said pairs of replication conflicting documents; and periodically automatically applying said sequence of predetermined attribute values at predetermined time intervals to each of paid pairs of said plurality of replication conflicting documents to resolve each conflict by eliminating one of the documents in said conflict for insufficient value of a predetermined attribute in said applied sequence of attributes.

6. The method of claim 5 wherein one of said sequence of attribute values to be applied is that only one of said pair of conflicting documents has been modified after one of said pair has been designated as the main document to thereby eliminate said unmodified document of said pair.

7. The method of claim 5 wherein one of said sequence of attribute values to be applied is that associated comments have been entered for only one of said pair of conflicting documents to thereby eliminate the document of said pair for without associated entered comments.

8. The method of claim 5 wherein one of said sequence of attribute values to be applied is that only one of said pair of conflicting documents has an associated data to thereby eliminate the document of said pair without an associated date.

9. A computer program having code recorded on a computer readable medium for periodically clearing stored document replication conflicts in a database system wherein a group of users have access to create and edit a plurality of documents stored in said database, said program comprising:

means for designating one document in each pair of a plurality of stored pairs of replication conflicting documents am the main document and the other of said pair as the secondary document;

means for storing all documents involved in each of said plurality of pairs of replication conflicting documents;

means for defining a prioritized sequence of predetermined attribute values to be applied to distinguish between the stored documents in each of said pairs of replication conflicting documents; and means for automatically periodically applying at predetermined time intervals said sequence of predetermined attribute values to each of said pairs of said plurality of replication conflicting documents to resolve each conflict by eliminating one of the documents in a pair of conflicting documents for insufficient value of a predetermined attribute in said applied sequence of attributes.

10. The computer program of claim 9 wherein one of said sequence of attribute values to be applied is that only one of said pair of documents has been modified after one of said pair has been designated as the main document to thereby eliminate said unmodified document of said pair.

11. The computer program of claim 9 wherein one of said sequence of attribute values to be applied is that only one of said pair of conflicting documents has associated entered comments to thereby eliminate the document of said pair without associated comments.

12. The computer program of claim 9 wherein one of said sequence of attribute values to be applied is that only one of said pair of conflicting documents has an associated date to thereby eliminate the document of said pair without an associated date.

* * * * *

UNITED STATES PATENT AND TRADEMARK OFFICE
CERTIFICATE OF CORRECTION

PATENT NO. : 6,915,311 B2
DATED : July 5, 2005
INVENTOR(S) : Bangel et al.

It is certified that error appears in the above-identified patent and that said Letters Patent is hereby corrected as shown below:

Column 6,
Line 54, please delete "stared" and insert -- stored --;

Column 7,
Line 11, please delete "of said pair".

Signed and Sealed this

Twenty-seventh Day of September, 2005

JON W. DUDAS
*Director of the United States Patent and Trademark Office*